Figure 1:
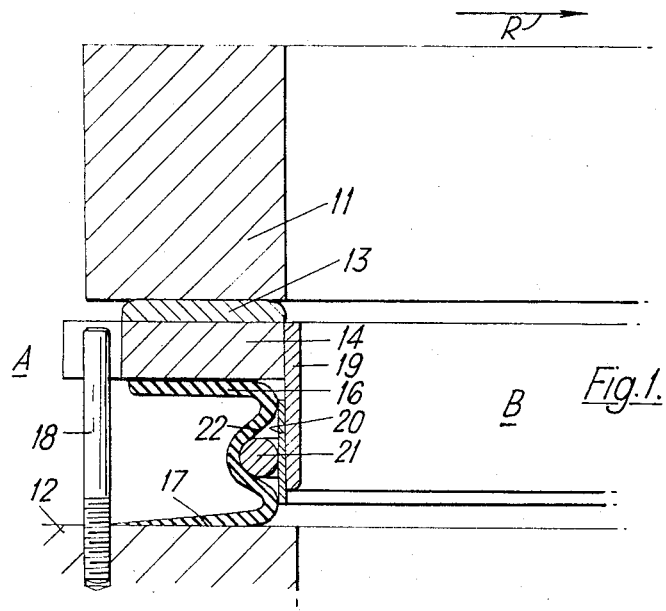

United States Patent
Barnard et al.

[11] 3,780,791
[45] Dec. 25, 1973

[54] THERMAL REGENERATORS

[76] Inventors: Mark Cary Sedgwick Barnard, "St. Andrews" Upper Ladyes Hill, Kenilworth; Lawrence Butler, 16 Henley Cres., Solihull, both of England

[22] Filed: Dec. 2, 1971

[21] Appl. No.: 204,168

[30] Foreign Application Priority Data
Dec. 4, 1970 Great Britain.................57861/70

[52] U.S. Cl..................... 165/9, 277/27, 277/81 R, 277/88
[51] Int. Cl............................................ F28d 19/00
[58] Field of Search................. 165/9; 277/27, 81 R, 277/88

[56] References Cited
UNITED STATES PATENTS

| | | | |
|---|---|---|---|
| 3,190,351 | 6/1965 | Savonuzzi | 165/9 |
| 3,202,207 | 8/1965 | Chute | 165/9 |
| 3,301,317 | 1/1967 | Weaving et al. | 165/9 X |
| 3,368,611 | 2/1968 | Bracken, Jr. et al. | 165/9 X |

*Primary Examiner*—Albert W. Davis, Jr.
*Attorney*—Thomas J. Greer, Jr.

[57] ABSTRACT

In a thermal regenerator for a gas turbine a matrix is rotatably mounted in a housing. To segregate high and low pressure gas flows through the matrix a sealing assembly is provided in which a pad seal is urged into contact with the matrix and the space between seal and housing is closed by an elastomeric curtain.

3 Claims, 2 Drawing Figures

PATENTED DEC 25 1973  3,780,791

THERMAL REGENERATORS

This invention relates to thermal regenerators (otherwise known as regenerative heat-exchangers) of the kind employing a moving matrix, e.g., a rotary disc-type matrix.

Thermal regenerators of the kind referred to are usually incorporated in gas turbine power plants to extract heat from the exhaust gases, and to transfer it to compressed intake-air before this enters the combustion chamber of the gas turbine engine. The rotary disc-type matrix normally employed is housed in the casing of the engine and comprises a foraminous refractory core (e.g., of ceramic or glass-ceramic material) formed with a multitude of open-ended, thin-walled passages lying substantially parallel to its rotational axis. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure zone, occupied by the compressed intake-air, and the low-pressure zone occupied by exhaust gases. To this end, it is common practice to employ a sealing element that makes rubbing contact with the corresponding face of the matrix, and which is mounted on a flexible member fixed to the casing of the engine. The intended purpose of the flexible mounting is to maintain contact between the matrix face and the counterface of the sealing element, thus sealing the high-pressure air, despite the quite considerable differential expansion which occurs between the engine casing and the matrix at high temperatures. As the air-pressure varies, so the intensity of the rubbing load must remain within definite limits set by the ability of the sealing assembly to seal efficiently on the one hand, and to avoid excessive rubbing loads (which are conducive to damage or rapid wear, or both) on the other hand. The same sealing assembly may also be used to support loads from the matrix disc, and to help retain its correct location.

According to this invention a thermal regenerator, of the kind having a rotary disc-type matrix mounted within, and adapted for rotation relative to, a casing; which matrix is adapted to be transversed by at least two segregated flows of gaseous heat-exchanging fluids; the regenerator being provided with a sealing assembly to segregate said flow characterised by:

a. a counterface pad seal adapted to rubbing contact with a face of the matrix;

b. a supporting ring on which said pad seal is mounted disposed between casing and matrix;

c. supporting ring locating means mounted on the casing and extending towards the matrix. The locating means enabling the supporting ring to move towards and away from the matrix while limiting movement of the supporting ring due to torque applied frictionally to the pad seal by rotation of the matrix relative to the pad;

e. a flexible sealing curtain of elastomeric material secured to the supporting ring and extending across a gap defined between the supporting ring and the casing (or an extension of the casing) the curtain serving to define a high pressure side and a low pressure side of the sealing assembly; and f. a curtain stiffening means secured to the casing or the supporting ring to enable the sealing curtain to slide on said stiffening means.

The supporting ring of the above-described sealing assembly preferably comprises a material which is of sufficiently low strength to ensure that thermal and other physical distortions will be accommodated by the air pressure loading across the sealing assembly to retain the pad in contact with the face of the matrix disc; and yet strong enough to withstand the collapsing loads of the air-pressure differential, and other loads such as the torque due to friction between the rotating disc and the stationary sealing pad. If the pad seal is of composite form, the material used for its foundation (i.e., main component) must also have an appropriate coefficient of expansion, such that the material is compatible with various possible coatings, such as nickel oxide, or with blocks pf rubbing material such as graphite. The pad seal may incorporate any kind of coating or block that is serviceable for the sealing function.

When the air-pressure is removed the curtain may need to be forcibly maintained in contact, or nearly in contact, with the casing. Typically this may be effected by the free edge zone of the curtain lying flat on the casing; so that, when the engine is started and air-pressure is built up in the 'high' region, the curtain is able to seal in a condition of very low pressure, well before engine idle speed is reached. However, other means may be necessary, such as a form of trap-plate to keep the free edge zone of the curtain on the surface of the casing; or an arrangement of resilient loading means such as spring throughout that zone to achieve the same effect (and probably also to assist the support to load the pad on to the matrix disc before air-pressure builds up, for example, during engine starting).

To resist the torque caused by friction between the rubbing surface and the matrix disc, one method is to provide the pad with at least three outwardly directed lateral projections and to transfer the torque loads from these to the casing; for example, by entrapping each projection between a pair of pins attached to, and standing up from, the casing.

Figure 2:
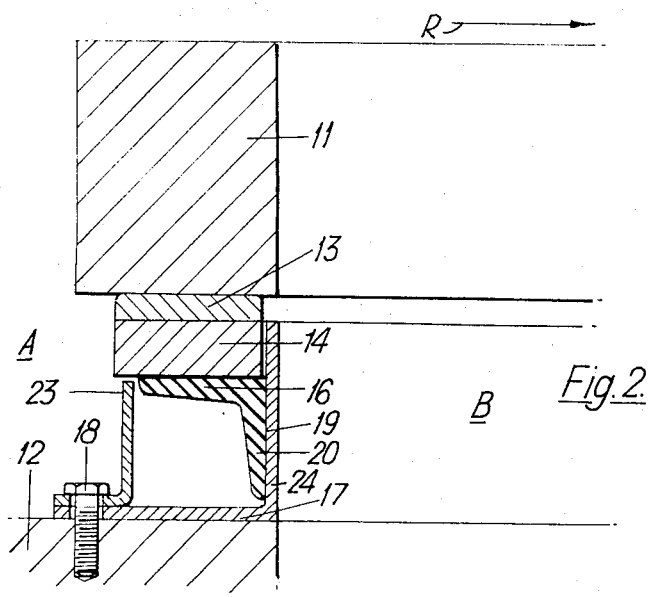

Embodiments of the invention will now be described by way of example with reference to the accompanying drawings of which:

FIG. 1 is a fragmentary cross-section of a first embodiment of a thermal regenerator and its cover; and FIG. 2 is a fragmentary cross-section of a second embodiment of a thermal regenerator and its cover.

Both FIG. 1 and FIG. 2 show part of a rotary disc-type matrix 11 enclosed in a casing of which only a part of a cover 12 is shown. A counterface pad seal 13 is mounted on a supporting ring 14. The pad seal 13, together with the components to be described hereafter, make up a sealing assembly which serve to divide a high-pressure zone A from a low-pressure zone B. The matrix 11, rotates relative to the cover 12, about an axis lying in the direction of arrow R and perpendicular to the surface of the matrix 11 contacted by pad 13.

Attention is now directed to FIG. 1. Supporting ring 14 has secured to it by adhesive 10 a flexible sealing curtain 16 of elastomeric material in this case a silicone rubber. The curtain 16 extends across the gap between the underside of ring 14 and the upper surface of casing 12 with which the free edge 17 of the curtain 16 is in fluid-tight sealing contact.

Supporting ring 14 has three slots in each of which is disposed a locating means in the form of a peg 18 which act to resist torque imparted to the pad 13 by matrix 11 when it is rotated.

The supporting ring 14 has secured to it a curtain retaining support 19 to prevent the curtain 16 being driven into the low pressure zone B by the action of the pressure differential across the sealing assembly. To maintain support of the curtain 16 by retaining support 19 over the range of movement of the seal support ring 14 away from the cover 12 a second retaining support 20 is provided which slides telescopically with respect to retaining support 19. The second retaining support 20 includes a circular cross-section ring 21 which is welded to the outer periphery of support 20 and which engages in a fold 22 of the curtain 16.

The free edge 17 of the curtain is held against the cover 12 by means of high pressure air maintained in zone A. To ensure that both curtain 16 and pad 13 remain in contact with cover 12 and disc 11 respectively before the air pressure builds up, typically during engine starting, an arrangement of springs can be used disposed between supporting ring 14 and the curtain.

Reference is now directed to FIG. 2. The underside of supporting ring 14 has attached to it by adhesive an elastomeric sealing curtain 26 of L-shaped section extending across a gap between supporting ring 14 and a rigid L-shaped section flange 27 secured to cover 12 by a series of bolts 28. Inner face 29 of limb 30 of the curtain 26 is in fluid-tight contact with the upstanding section 24 of flange 27.

Flange 27 serves to limit torque imparted to the pad 13 by matrix 11 by engagement with supporting ring 14 at intervals around the periphery of upstanding section 24 and supporting ring 14.

To prevent excessive movement of supporting ring 14 (and so of pad 13) away from the face of matrix 11 a limit stop 23 is bolted to cover 12, also by way of bolts 29. Such movements could occur for example before air pressure differential build up across the sealing assembly as at starting. Movement of pad 13 in a direction perpendicular to the matrix 11 is accommodated while maintaining an airtight seal by inner face 29 of curtain 26 sliding upwardly or downwardly over section 24 of flange 27.

We claim:

1. In a thermal regenerator of the kind having a rotary disc-type matrix mounted within, and adapted for rotation relative to, a casing; which matrix is adapted to be traversed by at least two segregated flows of gaseous heat exchange fluid; the regenerator being provided with a sealing assembly to segregate said flows said sealing assembly comprising in combination:
   a. a counterface pad seal adapted to make rubbing contact with a face of the matrix;
   b. a supporting ring on which said pad seal is mounted disposed between casing and matrix;
   c. supporting ring locating means mounted on the casing and extending towards the matrix; the locating means enabling the supporting ring to move towards and away from the matrix; while limiting movement of the supporting ring due to torque applied frictionally to the pad seal by rotation of the matrix;
   d. a flexible sealing curtain of elastomeric material secured to the supporting ring and extending across a gap defined between the supporting ring and the casing, the curtain serving to define a high pressure fluid side and a low pressure fluid side of the sealing assembly;
   e. curtain stiffening means secured to the casing or the supporting ring and adapted to enable the curtain to slide on said stiffening means.

2. The thermal regenerator of claim 1 characterised by the provision of limit stop means on the casing to limit movement of the supporting ring away from the matrix.

3. The thermal regenerator of claim 1 characterised in that the sealing curtain defines a fold extending parallel to the face of the matrix and the curtain stiffening means includes a ring member adapted to engage said fold and for sliding movement on said stiffening means.

* * * * *

UNITED STATES PATENT OFFICE
CERTIFICATE OF CORRECTION

Patent No. 3,780,791    Dated December 25, 1973

Inventor(s) Mark Cary Sedgwick Barnard et al.

It is certified that error appears in the above-identified patent and that said Letters Patent are hereby corrected as shown below:

-- Assignee: Leyland Gas Turbines Limited,

Warwickshire, England  --.

Signed and sealed this 4th day of February 1975.

(SEAL)
Attest:

McCOY M. GIBSON JR.
Attesting Officer

C. MARSHALL DANN
Commissioner of Patents